(12) United States Patent
Fujiwara et al.

(10) Patent No.: US 9,258,730 B2
(45) Date of Patent: Feb. 9, 2016

(54) WIRELESS SURVEILLANCE CAMERA SYSTEM AND WIRELESS SURVEILLANCE CAMERA DEVICE

(71) Applicant: Hitachi Kokusai Electric Inc., Chiyoda-ku, Tokyo (JP)

(72) Inventors: Ryosuke Fujiwara, Tokyo (JP); Makoto Katagishi, Tokyo (JP); Masayuki Miyazaki, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/422,988

(22) PCT Filed: Jun. 12, 2013

(86) PCT No.: PCT/JP2013/066170
§ 371 (c)(1),
(2) Date: Feb. 20, 2015

(87) PCT Pub. No.: WO2014/061307
PCT Pub. Date: Apr. 24, 2014

(65) Prior Publication Data
US 2015/0223099 A1    Aug. 6, 2015

(30) Foreign Application Priority Data

Oct. 16, 2012    (JP) ................. 2012-229219

(51) Int. Cl.
*H04N 7/18*    (2006.01)
*H04L 12/413*    (2006.01)
(Continued)

(52) U.S. Cl.
CPC ..... *H04W 28/0205* (2013.01); *G08B 13/19689* (2013.01); *H04L 65/1066* (2013.01);
(Continued)

(58) Field of Classification Search
CPC ................. H04W 28/0205; G08B 13/19689; H04N 7/185
See application file for complete search history.

(56) References Cited

U.S. PATENT DOCUMENTS

2001/0008415 A1*  7/2001  Park ................. H04M 1/7253
                                                         348/143
2006/0227801 A1   10/2006  Nanda et al.
(Continued)

FOREIGN PATENT DOCUMENTS

JP    11-205346 A    7/1999
JP    2003-143159 A    5/2003
(Continued)

OTHER PUBLICATIONS

Japanese-language Written Opinion dated Aug. 13, 2013 (Three (3) pages).
(Continued)

*Primary Examiner* — Dave Czekaj
*Assistant Examiner* — Tsion B Owens
(74) *Attorney, Agent, or Firm* — Crowell & Moring LLP

(57) ABSTRACT

To enable configuration and control of a camera at the same time while providing a certain band and low-delay communication for video and/or voice data, a wireless surveillance camera device includes: a signal processing unit that applies signal processing to the video and/or voice data; and a configuration unit that acquires configuration information data related to video parameters and/or wireless parameters in the device, wherein data communication of the video and/or voice data is performed for a wireless base station based on a polling system, and data communication of the configuration information data is performed for the wireless base station based on a carrier sense system.

14 Claims, 10 Drawing Sheets

(51) Int. Cl.
*H04W 28/02* (2009.01)
*G08B 13/196* (2006.01)
*H04L 29/06* (2006.01)
*H04W 72/12* (2009.01)
*H04W 74/02* (2009.01)
*H04W 74/06* (2009.01)
*H04W 74/08* (2009.01)

(52) U.S. Cl.
CPC ............... *H04L65/80* (2013.01); *H04N 7/181* (2013.01); *H04N 7/185* (2013.01); *H04W 72/1273* (2013.01); *H04W 74/02* (2013.01); *H04W 74/06* (2013.01); *H04W 74/0808* (2013.01)

(56) References Cited

U.S. PATENT DOCUMENTS

2008/0002045 A1* 1/2008 Wallach ................ H04N 7/185
348/311

2012/0281545 A1 11/2012 Fujiwara et al.
2013/0002868 A1* 1/2013 Yoshimitsu ...... G08B 13/19608
348/143
2013/0114622 A1 5/2013 Veyseh et al.
2013/0250120 A1* 9/2013 Ooi ........................ H04N 7/181
348/159

FOREIGN PATENT DOCUMENTS

| | | |
|---|---|---|
| JP | 2006-311520 A | 11/2006 |
| JP | 2009-100389 A | 5/2009 |
| JP | 2009-124302 A | 6/2009 |
| JP | 2009-141547 A | 6/2009 |
| JP | 2010-178347 A | 8/2010 |
| JP | 2012-235453 A | 11/2012 |

OTHER PUBLICATIONS

International Search Report dated Aug. 13, 2013 with English translation (Four (4) pages).

* cited by examiner

FIG. 11

| Data | Identification information | Meaning | Selected access system |
|---|---|---|---|
| Warning | 0 | Urgent | Both of polling and CSMA |
| Control (such as zoom) | 1 | Priority | One of polling and CSMA with smaller delay according to current communication performance |
| Voice and video | 2 | Real time | Polling |
| Configuration information | 3 | etc. | CSMA |

WIRELESS SURVEILLANCE CAMERA SYSTEM AND WIRELESS SURVEILLANCE CAMERA DEVICE

TECHNICAL FIELD

The present invention relates to a surveillance camera system and a surveillance camera device with a wireless communication function.

BACKGROUND ART

There are a large number of conventional techniques in which a wireless communication technique is applied to a surveillance camera system (for example, Patent Literature 1 and Patent Literature 2). For example, systems for transmitting a video taken by a surveillance camera through a wireless LAN (Local Area Network) are disclosed in Patent Literature 1 and 2. Furthermore, a system with a QoS (Quality of Service) function in a wireless LAN system using extended MAC (Media Access Control) of IEEE 802.11e is disclosed in Patent Literature 3.

Conventionally, two functions, DCF (Distributed Coordination Access) and PCF (Point Coordination Channel Access) are defined in the MAC of IEEE 802.11 standard. Furthermore, EDCA (Enhanced Distributed Channel Access) with QoS characteristics obtained by extending the DCF and HCCA (Hybrid coordinated function Controlled Channel Access) obtained by extending the PCF are defined in extended MAC of IEEE 802.11e.

The DCF and the EDCA are systems based on CSMA (Carrier Sense Multiple Access), and contention-based access means is provided to a terminal. The PCF and the HCCA are access methods using a polling system, and contention-free access means is provided to a terminal. A reference scheduling method using the HCCA is also disclosed in the IEEE 802.11e standard.

CITATION LIST

Patent Literature

Patent Literature 1: JP 2009-124302 A
Patent Literature 2: JP 2009-141547 A
Patent Literature 3: JP 2010-178347 A

SUMMARY OF INVENTION

Technical Problem

In a surveillance camera system, the taken video and/or voice data needs to be transmitted in real time without a delay, at a certain throughput (that is, QoS needs to be secured in the transmission). However, it is difficult to satisfy this request by the conventional wireless techniques.

An example of a wireless technique for providing the QoS includes a method of using the EDCA or the HCCA defined in the IEEE 802.11e standard. However, the following problems may occur in applying the EDCA or the HCCA to the surveillance camera system.

First, in the surveillance camera system, communication of configuration information, control information, and the like is necessary at the same time as the exchange of video and/or voice data. However, if the configuration information and the like are communicated at the same time by the same communication system as that of the video and/or voice data, the communication band of the video and/or voice data may be tightened by the configuration information and the like, and this may increase the transmission delay of the video and/or voice data. On the other hand, the system of communicating the configuration information and the like at the same time by the same communication system as that of the video and/or voice data may also increase the communication delay of data (for example, configuration information and control signal) other than the video or voice data.

Furthermore, when the reference scheduling method disclosed in IEEE 802.11e is applied to the surveillance camera system, a large number of retransmission opportunities need to be provided to the terminal in case that the wireless state is poor, and there is a problem that the transmission becomes inefficient. The increase in the retransmission opportunities also causes unreasonable occupation of transmission band, and communication by other wireless camera devices may be disturbed.

The present invention has been made in view of the technical problems, and the present invention provides a wireless surveillance camera system that can efficiently communicate configuration information of a camera device and a wireless device at the same time while ensuring a certain band and low-delay communication of video and/or voice data.

Solution to Problem

First Solution

An invention as a first solution is a wireless surveillance camera system including: (1) at least one wireless surveillance camera device including a camera device and a wireless device; and (2) a wireless base station that receives a wireless signal transmitted from the wireless surveillance camera device, and the wireless surveillance camera device and the wireless base station have the following features.

(1) The wireless base station includes: a transmission unit that wirelessly transmits a generated polling packet to each wireless surveillance camera device in a polling system; and a scheduling controller that controls transmission timing of the polling packet.

(2) The wireless surveillance camera device is (1) at least one wireless surveillance camera device including a camera device and a wireless device, the wireless surveillance camera device including: a signal processing unit that applies signal processing to video and/or voice data from the camera device; (2) an identification information categorization unit that adds identification information to the video data and/or voice data after the signal processing; (3) a configuration unit that acquires configuration information data (for example, video parameters and wireless parameters) related to video parameters and/or wireless parameters inside of the device; (4) a protocol processing unit that applies protocol processing (for example, network layer, transport layer, IEEE 802.11 protocol, and the like) to the video and/or voice data and the configuration information data to generate a communication frame; (5) at least one first transmission queue associated with a polling system (non-competitive access); (6) at least one second transmission queue associated with a carrier sense access system (competitive access); (7) a selection unit that refers to the identification information added to the communication frame to forward the video and/or voice data to the first transmission queue associated with the polling system and to forward the configuration information data to the second transmission queue associated with the carrier access system; (8) an interface controller that forwards the communication frames stored in the first and second transmission queues to the wireless device; and the wireless device including: (9) a first access controller that acquires a transmission right in the polling system; (10) a second access controller that acquires a transmission right in the carrier sense system; and (11) a transmission unit that wirelessly transmits the communication frames received from the first and second transmission queues at timings that the corresponding transmission rights are obtained.

Second Solution

In an invention as a second solution, the following function is added to the scheduling controller of the wireless base station in the wireless surveillance camera system according to the first solution. Specifically, added is a function of dividing one service interval into an exhaustive polling phase, a selective polling phase, and a carrier sense phase; scheduling polling for a registered wireless surveillance camera device at least once in the exhaustive polling phase; repeatedly scheduling polling for a wireless surveillance camera, for which a return frame for the polling is not normally received in the service interval, in the selective polling phase; and scheduling an access opportunity in the carrier sense system in the carrier sense phase without transmitting polling.

Third Solution

In an invention as a third solution, the following function is added to the wireless surveillance camera device in the wireless surveillance camera system according to the first solution. Specifically, added is a function of counting communication parameters (the number of polling receptions, the number of ACK receptions, and the like) indicating a state of communication with the wireless base station and generating; and transmitting a packet so as to forward the communication parameters to the second transmission queue associated with the carrier sense system.

Advantageous Effects of Invention

According to the present invention, efficient transmission of configuration information in the wireless surveillance camera device can be realized at the same time while ensuring a certain band and low-delay communication of video and/or voice data. Other problems, configurations, and advantageous effects will become apparent from the description of the following embodiments.

BRIEF DESCRIPTION OF DRAWINGS

FIG. 11 is an example of a table indicating a selection relationship between data types and access systems.

DESCRIPTION OF EMBODIMENTS

When the number of elements or the like (including the number, numerical value, quantity, range, and the like) is mentioned in the following description, the number is not limited to the specific number, and the number may be greater or smaller than the specific number, unless otherwise particularly specified or when the number is clearly limited to the specific number in principle. In the following embodiments, the constituent elements (including element steps and the like) are not always essential, unless otherwise particularly specified or when the constituent elements are clearly essential in principle.

In the following description, part or all of the configurations, functions, processing units, processing means, and the like may be realized by, for example, integrated circuits or other hardware. A processor may interpret and execute programs for realizing functions to realize the configurations, the functions, and the like. More specifically, the configurations, the functions, and the like may be realized by software. Information of the programs, tables, files, and the like for realizing the functions can be stored in a memory, a memory device such as a hard disk and an SSD (Solid State Drive), or a storage medium such as an IC card, an SD card, and a DVD.

Furthermore, control lines and information lines considered necessary for the description are illustrated, and not all control lines and information lines necessary for the product are illustrated. It can be considered that in reality, almost all of the components are mutually connected.

First Embodiment

[System Configuration]

Figure 1:
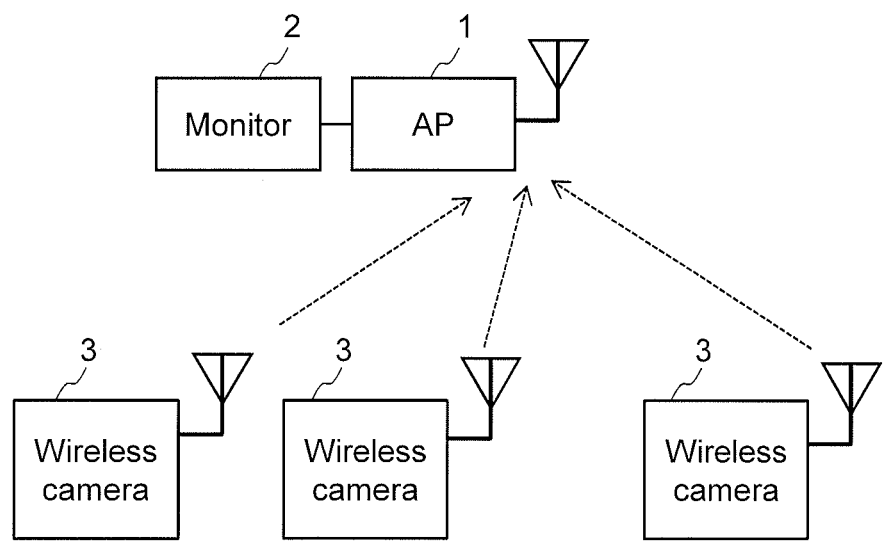
FIG. 1 is a diagram showing a configuration example of a wireless surveillance camera system according to a first embodiment.

FIG. 1 is a configuration example of a wireless surveillance camera system according to a first embodiment. The wireless surveillance camera system shown in FIG. 1 includes a wireless base station (AP) 1, a monitor device (Monitor) 2, and wireless camera devices (Wireless Cameras) 3. In the case of FIG. 1, a plurality of wireless camera devices 3 communicate with the wireless base station 1.

The monitor device 2 receives and displays video and/or voice data transmitted from the wireless camera devices 3. The monitor device 2 also provides a user interface function and a communication function for acquiring, configuring, and controlling configuration information of the wireless camera devices 3 as necessary. The configuration information includes, for example, configuration information of video parameters, configuration information of wireless parameters, and the like.

The configuration information of video parameters includes, for example, (1) codec information (type of codec (H.264, MPEG, or M-JPEG), image quality (compressibility), resolution, coded bit rate, and frame rate), (2) camera configuration information (whether to perform backlight correction, photometric area, whether to perform gamma correction, color level adjustment, black level adjustment, contour correction, zoom magnification, direction of camera, and the like), (3) voice information (codec, bit rate, reception timeout, microphone input level, line output level, and input mute level), and (4) other information (date information and NTP synchronization setting).

The configuration information of wireless parameters includes, for example, (1) network basic configuration information (IP address, DNS (Dynamic Name Resolution) information, port information, MTU (Maximum Transmission Unit) size, retransmission timeout time, ARP (Address Resolution Protocol) transmission time, and IP filter information), (2) user authentication information (ON/OFF of user authentication function and user configuration information (user name, password, and authority)), and (3) wireless configuration information (encryption key configuration, mode switching, transmission output change, carrier sense level change, and the like).

Although not written in FIG. 1, a memory device that stores video data (for example, hard disk device or storage device) and a computer for configuration may be connected to the monitor device 2.

[Configuration of Wireless Camera Device]

Figure 2:
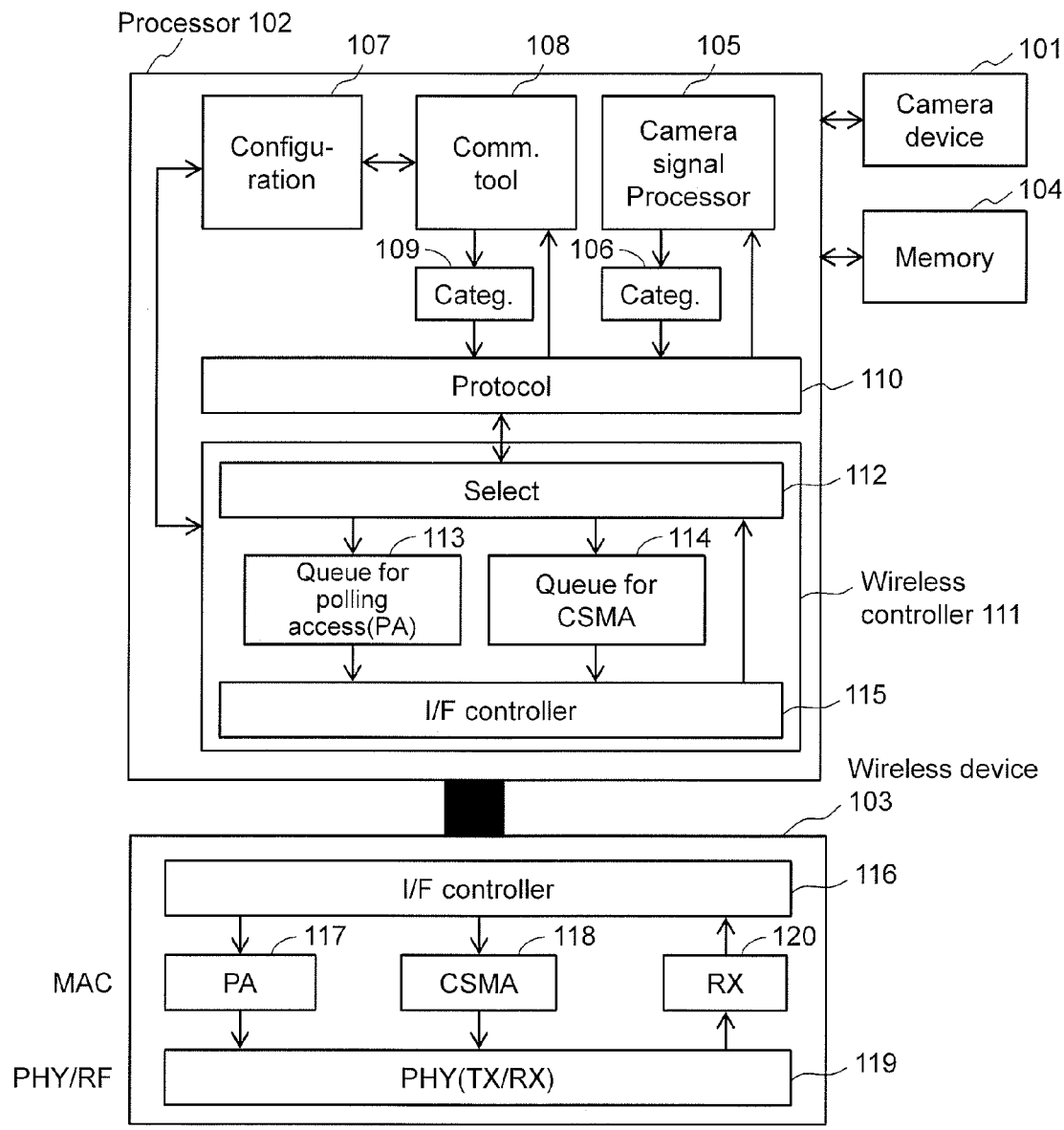
FIG. 2 is a diagram showing a configuration example of a wireless camera according to the first embodiment.
Figure 3:
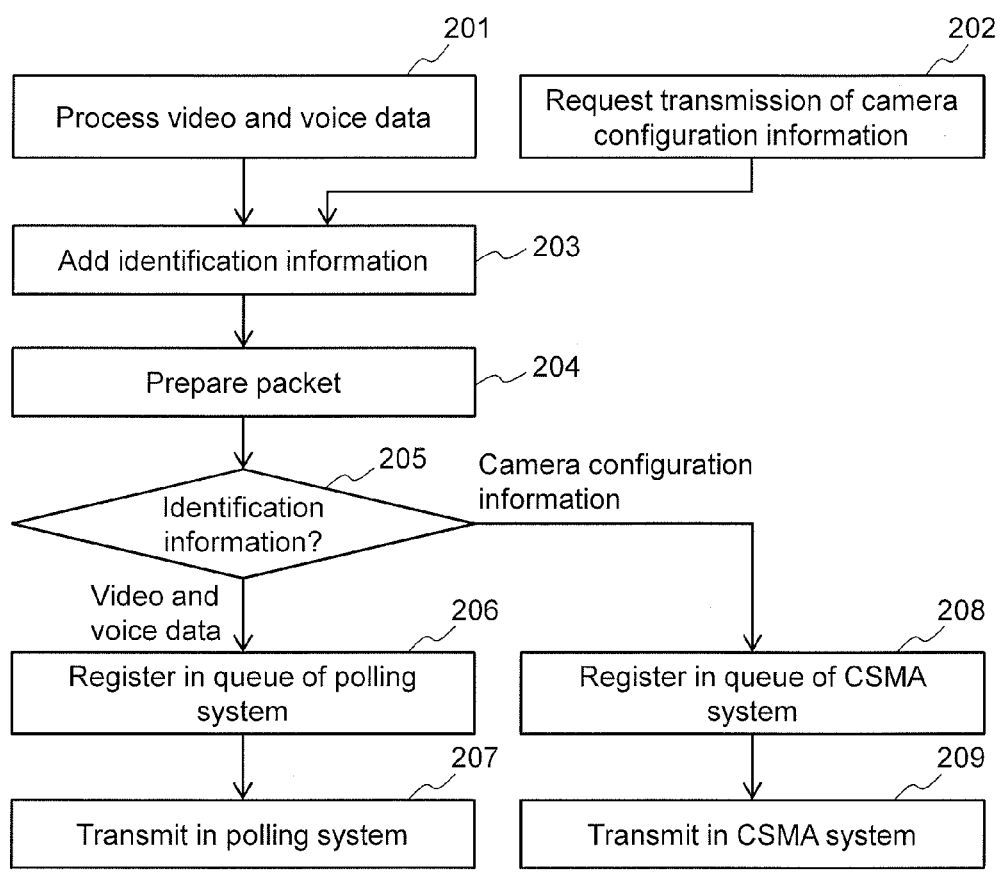
FIG. 3 is a flow chart showing an example of a data transmission procedure by the wireless camera according to the first embodiment.

FIG. 2 shows a configuration example of the wireless camera device 3, and FIG. 3 shows a data transmission procedure executed by the wireless camera device 3.

As shown in FIG. 2, the wireless camera device 3 includes a camera device (Camera device) 101, a processor (Processor) 102, a wireless device (Wireless device) 103, and a main memory device (Memory) 104. The camera device 101 according to the present embodiment also includes an imaging optical system not shown, an imaging element (for example, CMOS sensor), a microphone not shown, a function of outputting video data of images taken by the imaging element, and a function of outputting voice data of sound collected by the microphone.

Video or voice data acquired by the camera device 101 is forwarded to the processor 102. A camera signal processor 105 in the processor 102 applies signal processing, such as image compression, to the input video and voice data to process the data into a data format used for transmission (step 201). An identification information categorization unit (Categ.) 106 adds identification information, indicating the video or voice data, to the processed video or voice data and transmits the data to a protocol processing unit (Protocol) 110 (step 203).

The processor 102 also includes a configuration unit (Configuration) 107 and a communication tool (Comm. tool) 108. The configuration unit 107 provides, for example, an interface for remote operation from another wireless camera device or operation terminal, acquires configuration information related to video parameters and wireless parameters, and reflects and saves the configuration.

The configuration information here includes, for example, configuration information of video parameters, configuration information of wireless parameters, and the like.

The configuration information of video parameters includes, for example, (1) codec information (type of codec (H.264, MPEG, or M-JPEG), image quality (compressibility), resolution, coded bit rate, and frame rate), (2) camera configuration information (whether to perform backlight correction, photometric area, whether to perform gamma correction, color level adjustment, black level adjustment, contour correction, zoom magnification, direction of camera, and the like), (3) voice information (codec, bit rate, reception timeout, microphone input level, line output level, and input mute level), and (4) other information (date information and NTP synchronization setting).

The configuration information of wireless parameters includes, for example, (1) network basic configuration information (IP address, DNS (Dynamic Name Resolution) information, port information, MTU (Maximum Transmission Unit) size, retransmission timeout time, ARP (Address Resolution Protocol) transmission time, and IP filter information), (2) user authentication (ON/OFF of user authentication function and user configuration information (user name, password, and authority)), and (3) wireless configuration information (encryption key configuration, mode switching, transmission output change, carrier sense level change, and the like).

The communication tool 108 provides, for example, a Web server, a CUI (Command User Interface) server, and the like. The communication tool 108 receives configuration/control data transmitted from another terminal and forwards configuration information related to the wireless camera device 3, such as configuration information of the camera signal processor 105 and a wireless controller 111, to the configuration unit 107 (step 202). The communication tool 108 also acquires configuration information data related to the wireless camera device 3, such as configuration information data of the camera signal processor 105 or the wireless controller 111, through the configuration unit 107 and processes the data into a data format used for transmission. An identification information categorization unit (Categ.) 109 adds identification information indicating the configuration information data to the processed configuration information data and transmits the data to the protocol processing unit 110 (step 203).

The protocol processing unit 110 applies processing of transport layer and network layer, such as TCP/IP, or protocol processing of IEEE 802.11 to the transmitted data to generate a communication frame and transmits the communication frame to the wireless controller (Wireless controller) 111 (step 204).

A queue selection unit (Select) 112 of the wireless controller 111 determines whether the identification information added to the generated communication frame is video/voice data or camera configuration information (step 205). The queue selection unit (Select) 112 registers the communication frame of video or voice data in a transmission queue for polling access (Queue for polling access) 113 (step 206) and registers the communication frame of configuration information data in a transmission queue for carrier sense access (Queue for CSMA) 114 (step 208).

Interface controllers (I/F Controllers) 115 and 116 control exchange of information between the wireless device 103 and the processor 102. The communication frame of the transmission queue for polling access 113 is transmitted to a polling access controller (PA) 117 of the wireless device 103, and the communication frame of the transmission queue for carrier sense access 114 is transmitted to a carrier sense access controller (CSMA) 118 of the wireless device 103 (steps 207 and 209).

The polling access controller 117 of the wireless device 103 acquires a transmission right through the reception of a polling packet addressed to the station and transmits the communication frame to a transmission and reception unit (PHY (TX/RX)) 119 after the acquisition of the transmission right to perform wireless transmission.

The carrier sense access controller 118 of the wireless device 103 acquires a transmission right based on a carrier sense system and transmits the communication frame to the transmission and reception unit 119 after the acquisition of the transmission right to perform wireless transmission.

The wireless device 103 also includes a processing unit (RX) 120 that receives the wireless frame received from the transmission and reception unit 119 to forward the wireless frame to the processor 102.

Although the identification information categorization unit 109 adds the identification information to the configuration information data transmitted based on the carrier sense system in this embodiment, the identification information categorization unit 109 can be omitted. This is because when the identification information is added to the video or voice data, the queue selection unit 112 can determine that the communication frame without the addition of the identification information is the configuration information data and can register the data in the transmission queue for carrier sense access 114.

Although one processor 102 executes all of the processes in the description of the present embodiment, a configuration that a plurality of processors share and execute the processes may be adopted. For example, a dedicated LSI can be used to form the camera signal processor 105.

[Configuration of Wireless Base Station]

Figure 4:
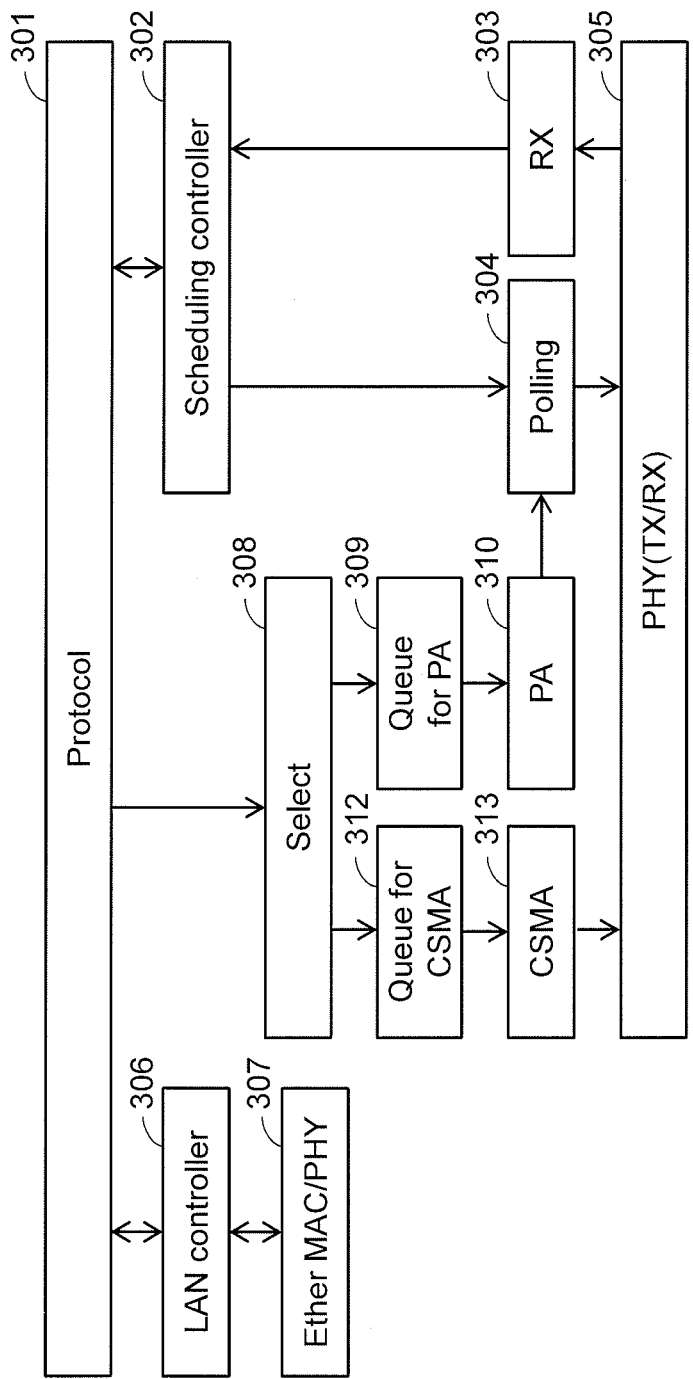
FIG. 4 is a diagram showing a configuration example of a wireless base station according to the first embodiment.

FIG. 4 shows a configuration example of the wireless base station 1 according to the present embodiment. In the wireless base station 1, a transmission and reception unit 305 receives a signal transmitted from the wireless camera device 3 and forwards the signal to a protocol processing unit 301 through a reception processing unit 303.

The wireless base station 1 uses a polling packet generation unit (Polling) 304 to generate a polling packet and wirelessly transmits the generated packet through the transmission and reception unit 305. The protocol processing unit 301 receives data transmitted through an upper layer, an Ethernet transmission and reception unit (Ether MAC/PHY) 307, or a LAN controller (LAN controller) 306 and forwards the data to a queue selection unit 308 to execute a forwarding process by wireless transmission as necessary. If the received data is a response frame for the video/voice data of the wireless camera device 3 transmitted from the monitor device 2, the queue selection unit 308 registers the data in a transmission queue for polling access (Queue for PA) 309. If the received data is other data, the queue selection unit 308 registers the data in a transmission queue for carrier sense access (Queue for CSMA) 312.

The transmission queue for polling access 309 forwards a communication frame registered in a polling access controller 310, and the transmission queue for carrier sense access 312 forwards a communication frame registered in a carrier sense access controller 313.

The polling access controller 310 adds the communication frame to the polling packet with the same address generated by the polling packet generation unit 304 to thereby perform simultaneous transmission at the polling packet transmission.

The carrier sense access controller 313 acquires the transmission right based on the carrier sense system and performs wireless transmission through the transmission and reception unit 305 after the acquisition of the transmission right.

A scheduling controller (Scheduling controller) 302 controls the transmission timing of the polling packet.

Figure 5:
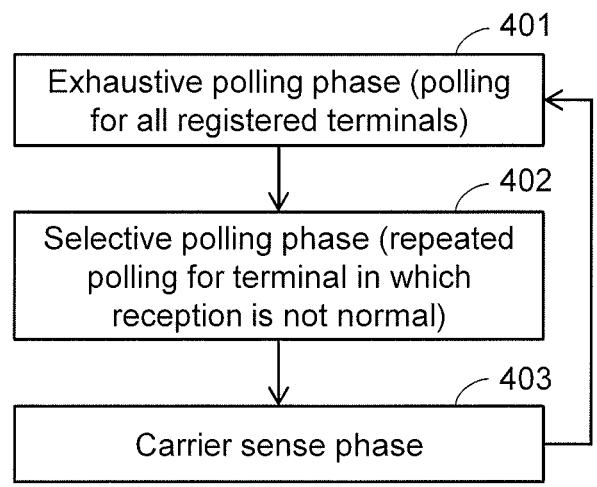
FIG. 5 is a flow chart showing an operation example of a scheduling controller in the wireless base station according to the first embodiment.
Figure 6:
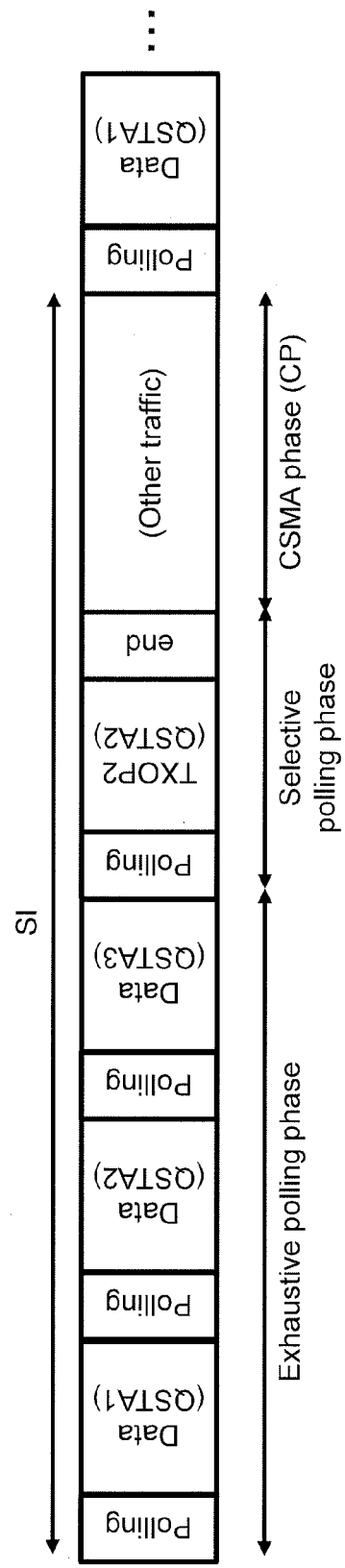
FIG. 6 is a diagram showing an example of a data structure based on the scheduling controller in the wireless base station according to the first embodiment.

FIG. 5 shows an example of scheduling operation performed by the scheduling controller 302. FIG. 6 shows an example of a data structure generated by the scheduling operation.

The scheduling controller 302 provides an exhaustive polling phase (Exhaustive polling phase) for performing polling of all registered wireless camera devices 3 once, to a first phase of each certain service interval (SI: Service Interval) (step 401).

The scheduling controller 302 provides, to the next phase, a selective polling phase (Selective polling phase) for selectively executing polling again for the wireless camera device 3, in which normal reception of video/voice data is not confirmed, and further repeating the polling until the normal reception is confirmed (step 402).

The scheduling controller 302 sets a carrier sense phase (CSMA phase), in which polling is not performed, in the last phase and provides a contention-based access phase (step 403). In the carrier sense phase, the carrier sense access controller 313 of the wireless base station 1 or the carrier sense access controller 118 of the wireless camera device 3 obtains the transmission right to start wireless transmission.

Figure 7:
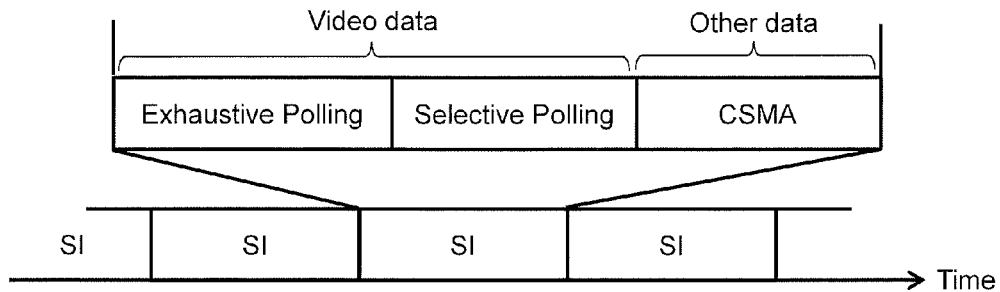
FIG. 7 is a diagram showing an example of a data structure in the wireless surveillance camera system according to the first embodiment.

FIG. 7 shows an example of a data structure realized by the wireless surveillance camera system according to the present embodiment. The data structure of wireless transmission includes the exhaustive polling phase, the selective polling phase, and the carrier sense phase in each service interval (SI). In the polling phase, the video or voice data is communicated by contention-free access. In the carrier sense phase, the configuration/control information and other information are communicated by contention-based access.

According to the wireless surveillance camera system of the present embodiment, low-delay communication in a certain band is provided for the video or voice data, and efficient communication by contention-based access is provided at the same time for the configuration/control data and the like of the camera/wireless device. In this way, a wireless surveillance camera system capable of flexible operation can be provided.

Furthermore, when a response is not obtained for consecutive M times (preset maximum number of times) in response to the polling for a specific wireless camera device 3, the scheduling controller 302 can terminate the transmission of polling for the wireless camera device 3 for a certain period (or proceed to polling for another wireless camera device 3).

Figure 8:
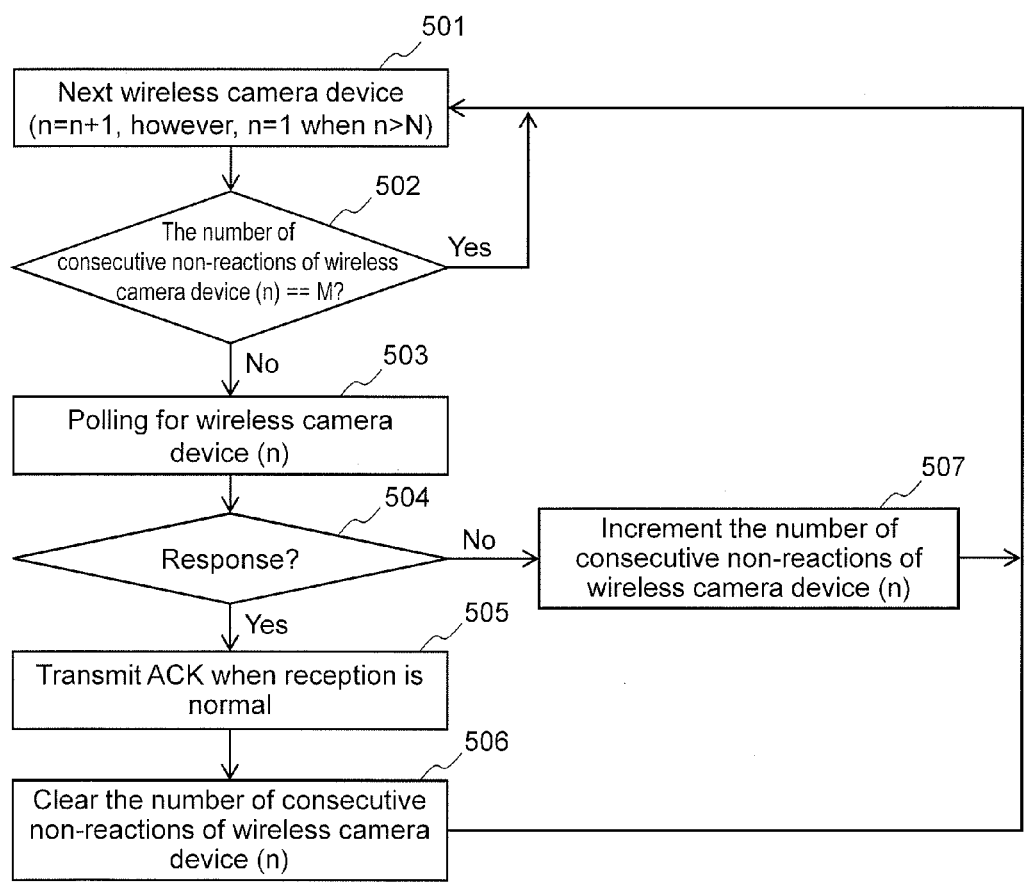
FIG. 8 is a flow chart showing an example of operation of handling a non-reaction terminal by the scheduling controller according to the first embodiment.

FIG. 8 shows an operation example of the scheduling controller 302 terminating the polling when there is no reaction from a specific wireless camera device 3 for M consecutive times. The scheduling controller 302 first executes processing operation of changing the transmission destination to the next wireless camera device 3 (step 501). Specifically, 1 is added to an identification number n for specifying the wireless camera device 3. However, if the identification number n+1 after the addition exceeds a maximum number N of wireless camera devices 3 to be polled, the identification number n+1 after the addition is returned to 1 in the operation. Subsequently, the scheduling controller 302 determines whether the number of consecutive non-reactions has reached the maximum number of times M (step 502). If an affirmative result is obtained, the scheduling controller 302 returns to step 501 to change the polling destination because the number of consecutive non-reactions of the corresponding wireless camera device 3 has reached the maximum value. On the other hand, if a negative result is obtained, the scheduling controller 302 executes polling for the corresponding wireless camera device 3 (step 503). Next, the scheduling controller 302 determines the presence or absence of a response (step 504).

If there is no response, the scheduling controller 302 increments the number of consecutive non-reactions of the corresponding wireless camera device 3 by 1 and returns to step 501 (step 507). If a response is normally received, the scheduling controller 302 transmits ACK (step 505) and clears the number of consecutive non-reactions of the corresponding wireless camera device 3 (step 506).

The operation can prevent adversely affecting other communications even if the wireless camera device 3 cannot communicate due to a failure, communication path cutoff, or the like.

[Conclusion]

As described, the wireless surveillance camera system according to the present embodiment transmits the video/voice data in the polling system and transmits the camera configuration information and the like other than the video/voice data in the CSMA system. In this way, the video/voice data and the camera configuration information and the like are transmitted in different communication systems, and thus the band of the video/voice data is not affected even if the camera configuration information is transmitted at the same time as the video/voice data. Therefore, a wireless surveillance camera system capable of transmitting the camera configuration information at the same time can be realized without exerting an influence, such as a delay, on the video/voice data.

Furthermore, even if the allocated band for the video/voice data is smaller than the request band due to poor transmission performance (even if the transmission band of the video/voice data reaches the limit value), the camera configuration information and the like can be transmitted in the CSMA system, and a situation that the wireless camera device 3 becomes out of control can be prevented. When the wireless camera devices 3 can be always controlled in this way, the amount of generation of the video/voice data can be optimized in each wireless camera device, and the request band can be changed to a band lower than the transmission band.

Furthermore, according to the wireless surveillance camera system of the present embodiment, even if the entire transmission band is occupied due to deterioration in the performance of transmission of video/voice data to and from a specific wireless camera device 3 using polling, the scheduling controller 302 can stop the polling for the corresponding wireless camera device 3 for a certain period to prevent a situation in which communication of video/voice data between the other wireless camera devices 3 and the wireless base station 1 is disturbed.

Second Embodiment

[Device Configuration]

The configuration of a wireless surveillance camera system according to the present embodiment is the same as the configuration of the first embodiment, except for the configuration of the wireless camera device 3.

Figure 9:
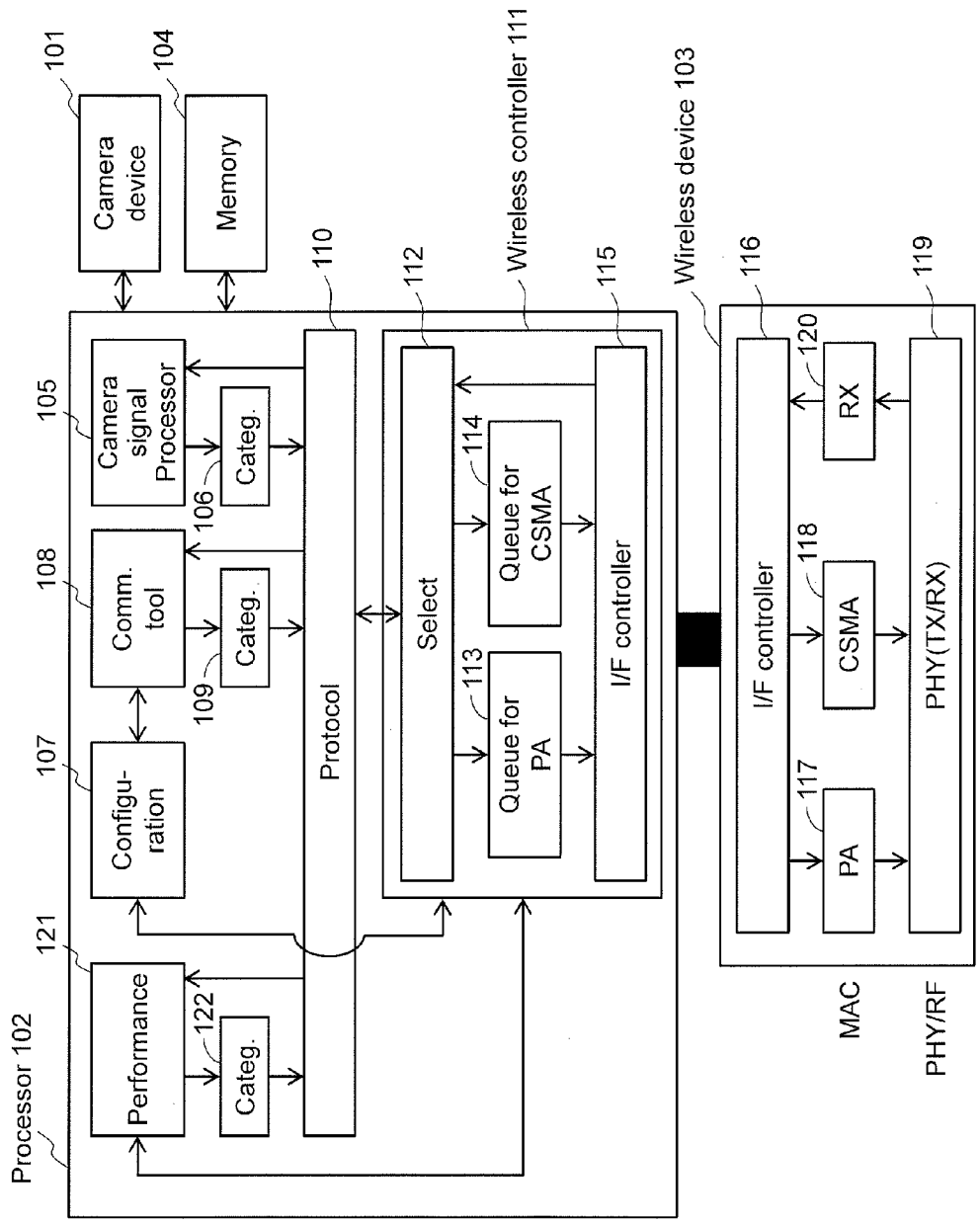
FIG. 9 is a diagram showing a configuration example of a wireless camera included in a wireless surveillance camera system according to a second embodiment.

FIG. 9 is a configuration example of the wireless camera device 3 used in the wireless surveillance camera system according to a second embodiment. In FIG. 9, the same reference signs are provided to the parts corresponding to FIG. 2. The wireless camera device 3 according to the present embodiment has the same configuration as the wireless camera device 3 shown in FIG. 2, except that a communication performance confirmation unit (Performance) 121 and an identification information categorization unit (Categ.) 122 are added.

The communication performance confirmation unit 121 acquires communication parameters, such as the number of polling receptions, the number of ACK receptions, and the number of data transmissions, in the wireless controller 111 and processes the parameters into a data format used for transmission. The identification information categorization unit 122 adds identification information indicating the communication parameters and forwards the information to the protocol processing unit 110. The protocol processing unit 110 sends out a frame to which the identification information indicating the communication parameters is added, to the queue selection unit 112.

The queue selection unit 112 determines whether the identification information added to the frame is video/voice data or camera configuration information and communication parameters. The queue selection unit 112 registers the frame determined to be a frame including video/voice data in the transmission queue for polling access 113 and registers the frame determined to be a frame including camera configuration information and communication parameters in the transmission queue for carrier sense access 114.

In this way, the information regarding the communication performance collected by the communication performance confirmation unit 121 is wirelessly transmitted to the wireless base station 1 through the carrier sense access controller 118.

The other operation is the same as in the wireless camera device 3 according to the first embodiment described in FIG. 2.

If it is defined that the queue selection unit 112 registers the frame to which the identification information is not added in the transmission queue for carrier sense access 114, the identification information categorization unit 122 can be omitted from the configuration shown in FIG. 9.

The scheduling controller 302 (FIG. 4) receives and processes the frame transmitted from the wireless camera device 3 to the wireless base station 1. In the present embodiment, the frame received by the scheduling controller 302 includes the communication parameters transmitted from the wireless camera device 3. The scheduling controller 302 controls the transmission timing of polling based on the communication parameters. For example, if the communication performance is poor, the scheduling controller 302 instructs to increase the polling frequency to secure the communication quality between the corresponding wireless camera device 3 and the wireless base station 1. If the communication performance is worse, and further increase in the polling frequency affects the communication with other wireless camera devices 3, the scheduling controller 302 can, for example, stop the polling for the wireless camera device 3 (transmission of the response frame for the video/voice data).

The monitor device 2 shown in FIG. 1 can process the communication parameters transmitted from the wireless camera device 3 as necessary to display communication performance/quality and the like on the screen. Even when the communication performance/quality and the like is not displayed on the screen, the monitor device 2 can use an alarming device not shown (for example, LED and speaker) to alarm and notify the manager when the communication parameter exceeds a threshold.

[Conclusion]

In the wireless surveillance camera system according to the present embodiment, the polling frequency can be adjusted according to the communication performance even if the communication performance is poor in some extent, and robust communication can be provided. Furthermore, the wireless surveillance camera system according to the present embodiment can notify the manager of the performance of communication with each wireless camera device 3 in advance, and measures can be promoted before the occurrence of sudden video cutoff.

Third Embodiment

[Device Configuration]

The configuration of a wireless surveillance camera system according to the present embodiment is the same as the configuration of the first embodiment, except for the configuration of the wireless camera device 3.

Figure 10:
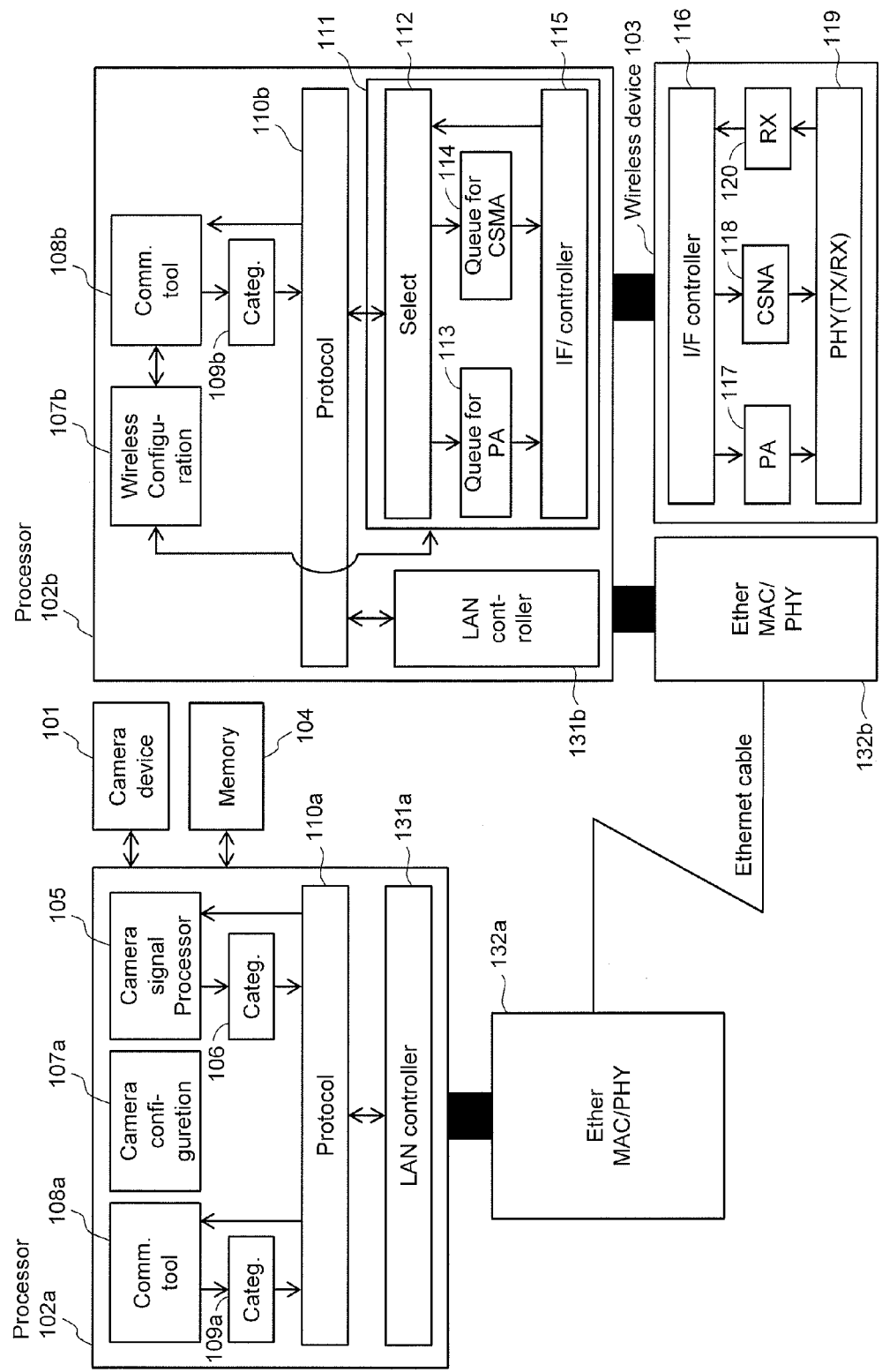
FIG. 10 is a diagram showing a configuration example of a wireless camera included in a wireless surveillance camera system according to a third embodiment.

FIG. 10 shows a configuration example of the wireless camera device 3 used in the wireless surveillance camera system according to the third embodiment. In FIG. 10, the same reference signs are provided to the parts corresponding to FIG. 2.

The wireless camera device 3 according to the present embodiment includes: the camera device (Camera device) 101; a first Ethernet transmission and reception unit (Ether MAC/PHY) 132a; a first processor (Processor) 102a connected to the camera device 101 and the first Ethernet transmission and reception unit 132a; the main memory device (Memory) 104; a second Ethernet transmission and reception unit 132b connected to the first Ethernet transmission and reception unit 132a through an Ethernet cable; the wireless device (Wireless device) 103; and a second processor 102b connected to the second Ethernet transmission and reception unit 132b and the wireless device 103.

In the present embodiment, a housing for mounting the camera device 101 and a housing for mounting the wireless device 103 are separate housings in the wireless camera device 3.

In the present embodiment, the video and voice data acquired by the camera device 101 is forwarded to the first processor 102a. In the first processor 102a, the camera signal processor 105 applies signal processing, such as image compression, to the input video and voice data to process the data into a data format used for wireless transmission. The processed video or voice data is provided to the identification information categorization unit (Categ.) 106. The identification information categorization unit 106 adds identification information indicating the video or voice data to the processed video or voice data and transmits the data to a protocol processing unit (Protocol) 110a.

The first processor 102a also includes a configuration unit (Configuration) 107a and a communication tool (Comm. Tool) 108a. The configuration unit 107a provides, for example, an interface for remote operation from another wireless camera device 3 or operation terminal, acquires configuration information related to video parameters and wireless parameters, and reflects and saves the configuration. The communication tool 108a provides, for example, a Web server, a CUI (Command User Interface) server, and the like.

The communication tool 108a of the first processor receives configuration/control data transmitted from another terminal and forwards configuration information related to the wireless camera, such as configuration information of the camera signal processor 105 and the like, to the configuration unit 107a. The communication tool 108a acquires configuration information related to the wireless camera device 3, such as configuration information of the camera signal processor 105 and the like, through the configuration unit 107a and processes the information into a data format used for transmission. An identification information categorization unit (Categ.) 109a adds identification information indicating the configuration information data to the processed configuration information data and transmits the data to the protocol processing unit 110a.

The protocol processing unit 110a of the first processor 102a applies processing of transport layer and network layer, such as TCP/IP, to the transmitted data as necessary to generate a communication frame and transmits the communication frame to the first Ethernet transmission and reception unit 132a through a LAN controller (LAN controller 131a).

The first Ethernet transmission and reception unit 132a transmits the communication frame to the second Ethernet transmission and reception unit 132b through an Ethernet cable. Through the transmission, the communication frame generated by the first processor 102a is forward to the second processor 102b. A LAN controller 131b of the second processor 102b processes the received communication frame and transmits the frame to a protocol processing unit 110b.

The second processor 102b includes a configuration unit (Configuration) 107b and a communication tool (Comm. Tool) 108b. The configuration unit 107b provides an interface for remote operation from another wireless camera device 3 or operation terminal, acquires configuration information related to wireless parameters, and reflects and saves the configuration. The communication tool 108b provides, for example, a Web server and a CUI (Command User Interface) server. The communication tool 108b receives configuration/control data transmitted from another terminal and forwards configuration information related to the wireless camera device 3, such as configuration information in the wireless controller 111 and the like, to the configuration unit 107b. The communication tool 108b acquires configuration information related to the wireless camera device 3, such as configuration information in the wireless controller 103 and the like, and processes the information into a data format used for transmission. An identification information categorization unit (Categ.) 109b adds identification information indicating the configuration information data to the processed configuration information data and transmits the data to the protocol processing unit 110b.

The protocol processing unit 110b of the second processor 102b applies processing of transport layer and network layer, such as TCP/IP, or protocol processing of IEEE 802.11 as necessary to the transmitted data and forwards the data to the wireless controller (Wireless controller) 111.

The queue selection unit (Select) 112 of the wireless controller 111 determines the registration destination of the communication frame according to the identification information added to the generated communication frame. For example, the queue selection unit 112 registers the communication frame of video or voice data in the transmission queue for polling access (Queue for polling access) 113 and registers the communication frame of configuration information data in the transmission queue for carrier sense access (Queue for CSMA) 114.

The interface controller (I/F Controller) 115 of the second processor 102b controls exchange of information between the wireless device 103 and the processor 102b. The communication frame of the transmission queue for polling access 113 is transmitted to the polling access controller (PA) 117 of the wireless device 111, and the communication frame of the transmission queue for carrier sense access 114 is transmitted to the carrier sense access controller (CSMA) 118 of the wireless device 103.

The polling access controller 117 of the wireless device 103 acquires the transmission right through the reception of a polling packet addressed to the station and transmits the communication frame to the transmission and reception unit (PHY (TX/RX)) 119 after the acquisition of the transmission right to perform wireless transmission. The carrier sense access controller 118 of the wireless device 103 acquires the transmission right based on the carrier sense system and transmits the communication frame to the transmission and reception unit 119 after the acquisition of the transmission right to perform wireless transmission.

The wireless device 103 also includes the processing unit (RX) 120 that receives the communication frame received from the transmission and reception unit 119 to forward the communication frame to the processor 102b.

Although the identification information categorization unit 109 adds the identification information to the configuration information data transmitted based on the carrier sense system in this embodiment, the identification information categorization unit 109 is not always necessary. Since the identification information is added to the video or voice data, the queue selection unit 112 can select the transmission queue for carrier sense access 114 if the identification information is not added.

[Conclusion]

According to the wireless surveillance system of the present embodiment, a certain band and low-delay communication can be provided for the video or voice data even when the camera device 101 and the wireless device 103 are not physically in the same housing, and at the same time, efficient best-effort communication can be provided for the configuration/control data and the like of the camera/wireless device.

Although the Ethernet cable is used for the communication between the first processor 102a and the second processor 102b in the description of the present embodiment, the arrangement is not limited to this. This is because an interface such as a USB can also be used, for example.

Fourth Embodiment

Lastly, an example of adding identification information to data and an example of selecting an access system will be described. FIG. 11 shows an example of a correspondence. In the example of FIG. 11, the configuration information (identification information 3) is communicated in the CSMA system, and the voice or video data (identification information 2) is communicated in the polling system. If it is defined that the communication is to be performed in the CSMA system when the identification information is not added, the identification information may not be added to the configuration information.

In FIG. 11, a control signal (identification information 1) of zoom, pan, or the like that requires low-delay control is communicated by using one of the polling system and the CSMA system with a smaller delay according to the current communication performance. This is because the real-time property of the control of zoom or pan of the wireless surveillance camera is high in the wireless surveillance camera system. The current communication performance can be recognized by monitoring the number of polling transmissions and receptions, the number of ACK receptions, the number of data transmissions, and the like in the wireless camera device 3 and the wireless base station 102. A mechanism of selecting the system used for the communication based on the recognized result can be provided in the wireless camera device 3 and the wireless base station 102 to realize the control.

An urgent warning signal (identification information 0) is communicated by using both of the polling system and the CSMA system because the data needs to be transferred as early as possible.

REFERENCE SIGNS LIST 1 wireless base station (AP)
2 monitor device (Monitor)
3 wireless camera device (Wireless camera)
101 camera device (Camera device)
102 processor (Processor)
103 wireless device (Wireless device)
104 main memory device (Memory)
105 camera signal processor (Camera signal processor)
106, 109, 122 identification information categorization units (Categ.)
107 configuration unit (Configuration)
108 communication tool (Comm. Tool)
110 protocol processing unit (Protocol)
111 wireless controller (Wireless controller)
112 queue selection unit (Select)
113 transmission queue for polling access (Queue for polling access (PA))
114 transmission queue for carrier sense access (Queue for CSMA)
115, 116 interface controllers (I/F controllers)
117 polling access controller (PA)
118 carrier sense access controller (CSMA)
119 transmission and reception unit (PHY (TX/RX))
120 reception processing unit (RX)
121 communication performance confirmation unit (Performance)
131a, b LAN controllers (LAN controllers)
132a, b Ethernet transmission and reception units (Ether MAC/PHY)
301 protocol processing unit (Protocol)
302 scheduling controller (Scheduling controller)
303 reception processing unit (RX)
304 polling packet generation unit (Polling)
305 transmission and reception unit (PHY (TX/RX))
306 LAN controller (LAN controller)
307 Ethernet transmission and reception unit (Ether MAC/PHY)
308 queue selection unit (Select)
309 transmission queue for polling access (Queue for PA)
310 polling access controller (PA)
312 transmission queue for carrier sense access (Queue for CSMA)
313 carrier sense access controller (CSMA)

The invention claimed is:

1. A wireless surveillance camera system comprising:
(1) a wireless base station that receives a wireless signal transmitted from at least one wireless surveillance camera device, the wireless base station comprising:
a transmission unit that wirelessly transmits a generated polling packet to each wireless surveillance camera device in a polling system; and
a scheduling controller that controls transmission timing of the polling packet; and
(2) at least one wireless surveillance camera device comprising a camera device and a wireless device, the wireless surveillance camera device comprising:
a signal processing unit that applies signal processing to video and/or voice data from the camera device;
an identification information categorization unit that adds identification information to the video data and/or voice data after the signal processing;
a configuration unit that acquires configuration information data related to video parameters and/or wireless parameters inside of the device;
a protocol processing unit that applies protocol processing to the video and/or voice data and the configuration information data to generate a communication frame;
at least one first transmission queue associated with the polling system;

at least one second transmission queue associated with a carrier sense access system;
a selection unit that refers to the identification information added to the communication frame to forward the video and/or voice data to the first transmission queue associated with the polling system and to forward the configuration information data to the second transmission queue associated with the carrier access system;
an interface controller that forwards the communication frames stored in the first and second transmission queues to the wireless device; and
the wireless device comprising: a first access controller that acquires a transmission right in the polling system; a second access controller that acquires a transmission right in the carrier sense system; and a transmission unit that wirelessly transmits the communication frames received from the first and second transmission queues at timings that the corresponding transmission rights are obtained.

2. The wireless surveillance camera system according to claim 1, wherein
the scheduling controller in the wireless base station divides one service interval into an exhaustive polling phase, a selective polling phase, and a carrier sense phase, schedules polling for a registered wireless surveillance camera device at least once in the exhaustive polling phase, repeatedly schedules polling for a wireless surveillance camera, for which a return frame for the polling is not normally received in the service interval, in the selective polling phase, and schedules an access opportunity in the carrier sense system in the carrier sense phase without transmitting polling.

3. The wireless surveillance camera system according to claim 1, wherein
the configuration information data includes at least one of codec information, camera configuration information, and voice information as the video parameters.

4. The wireless surveillance camera system according to claim 1, wherein
the configuration information data includes at least one of network basic configuration information, user authentication information, and wireless configuration information as the wireless parameters.

5. The wireless surveillance camera system according to claim 1, wherein
the wireless base station transmits, in the carrier sense system, the configuration information data for the camera device or the wireless device in the wireless surveillance camera device forwarded from an upper layer or another device.

6. The wireless surveillance camera system according to claim 5, wherein
the wireless surveillance camera device comprises a second configuration unit that acquires the configuration information data from the communication frame received from the wireless base station to reflect the acquired configuration information data on a corresponding part.

7. The wireless surveillance camera system according to claim 5, wherein
the wireless base station transmits a response packet for the video and/or voice data received from the wireless surveillance camera device and processed in the upper layer to the wireless surveillance camera device in the polling system.

8. The wireless surveillance camera system according to claim 1, wherein the wireless surveillance camera device counts communication parameters indicating a state of communication with the wireless base station and generates and transmits a communication frame so as to forward the communication parameters to the second transmission queue associated with the carrier sense system.

9. The wireless surveillance camera system according to claim 8, further comprising
a monitor device that is connected to the wireless base station to display or reproduce the video and/or voice data received by the wireless base station and that displays communication performance acquired by the reception of the communication frame including the communication parameters.

10. The wireless surveillance camera system according to claim 8, wherein
when the scheduling controller in the wireless base station receives the communication frame including the communication parameters, the scheduling controller changes a polling frequency for the corresponding wireless surveillance camera device based on a notified communication state.

11. The wireless surveillance camera system according to claim 1, wherein
when a response for the polling of a specific wireless surveillance camera device is not obtained for a predetermined consecutive number of times, the scheduling controller in the wireless base station terminates the polling of the specific wireless surveillance camera device for a certain time.

12. A wireless surveillance camera device comprising:
a camera device;
a wireless device;
a signal processing unit that applies signal processing to video and/or voice data from the camera device;
an identification information categorization unit that adds identification information to the video data and/or voice data after the signal processing;
a configuration unit that acquires configuration information data related to video parameters and/or wireless parameters inside of the device;
a protocol processing unit that applies protocol processing to the video and/or voice data and the configuration information data to generate a communication frame;
at least one first transmission queue associated with the polling system;
at least one second transmission queue associated with a carrier sense access system;
a selection unit that refers to the identification information added to the communication frame to forward the video and/or voice data to the first transmission queue associated with the polling system and to forward the configuration information data to the second transmission queue associated with the carrier access system;
an interface controller that forwards the communication frames stored in the first and second transmission queues to the wireless device; and
the wireless device comprising: a first access controller that acquires a transmission right in the polling system; a second access controller that acquires a transmission right in the carrier sense system; and a transmission unit that wirelessly transmits the communication frames received from the first and second transmission queues at timings that the corresponding transmission rights are obtained.

13. The wireless surveillance camera system according to claim 12, wherein the configuration information data includes at least one of codec information, camera configuration information, and voice information as the video parameters.

14. The wireless surveillance camera system according to claim 12, wherein the configuration information data includes at least one of network basic configuration information, user authentication information, and wireless configuration information as the wireless parameters.

* * * * *